United States Patent [19]

Lee

[11] Patent Number: 4,986,519

[45] Date of Patent: Jan. 22, 1991

[54] VICE

[76] Inventor: Chi-Jen Lee, No. 1-7, Lane 248, Chung Chen Rd., Shu Lin Chen, Taipei Hsien, Taiwan

[21] Appl. No.: 540,703

[22] Filed: Jun. 20, 1990

[51] Int. Cl.[5] .............................................. B23Q 3/06

[52] U.S. Cl. ...................................... 269/137; 269/195

[58] Field of Search ............... 269/137, 165, 189, 194, 269/195, 207, 211, 212, 213, 215, 240

[56] References Cited

U.S. PATENT DOCUMENTS

| | | | |
|---|---|---|---|
| 4,138,100 | 2/1979 | Krummenacher | 269/137 |
| 4,243,213 | 1/1981 | Georgian | 269/137 |
| 4,562,999 | 1/1986 | Ryser | 269/137 |

*Primary Examiner*—Robert C. Watson
*Attorney, Agent, or Firm*—Steinberg & Raskin

[57] ABSTRACT

A vice includes a base, a rectangular positioning body, a block and a fastening assembly. The base has a track and a fixed jaw formed at a first end thereof and a movable jaw provided on the track at a second end thereof. A first rectangular recess is formed on an underside of the base for receiving the rectangular positioning body. The rectangular positioning body has a central slot extending longitudinally and defining two longitudinal side walls. A plurality of holes are formed on each longitudinal side wall of the positioning body. A second recess is provided on an underside of the positioning body and extending along a length of the slot in the longitudinal direction and extending transversely a distance half the width of the longitudinal side walls such that the holes are notched. A projection protrudes from an end of the top surface of the positioning body and is located below the fixed jaw when the positioning body is received in the first recess of the base.

3 Claims, 5 Drawing Sheets

VICE

BACKGROUND OF THE INVENTION

The present invention relates to a vice for machining, plate working, and other precision metal working processes.

In the past, vices used for metal processes have had a jaw A fixed at one end of a base A1 and a movable jaw B engaged in a track along the base A1 so as to fasten a processing material D in cooperation with a fastening means C, as shown in FIG. 5 of the drawings. This vice does not provide compensation for the forces a and b, caused by the clamping function of the device, as shown in FIG. 6. As the movable jaw B is drawn in and tightened against the processing material D, the base A1 will flex because of the vice's rigid nature. This is caused by a series of resultant forces. The processing material exerts a pair of forces a and b on the jaws A and B which in turn cause a pair of forces c and d. Then an upward force on the processing material is the result of forces c and d. Obviously, this will cause inaccurate machining of the material and unnecessary errors.

The present invention intends to provide a vice to eliminate the above-mentioned problems.

SUMMARY OF THE INVENTION

It is a primary object of the present invention to provide a vice having a block provided under a movable jaw to eliminate deformation of the vice and the processing material.

It is another object to provide a strip-like projection on the rectangular body of the vice to eliminate deformation of the vice and the processing material.

These and additional objects, if not set forth specifically herein, will be readily apparent to those skilled in the art from the detailed description provided hereunder, with appropriate reference to the accompanying drawings.

DETAILED DESCRIPTION OF THE PREFERRED EMBODIMENT

Figure 1:
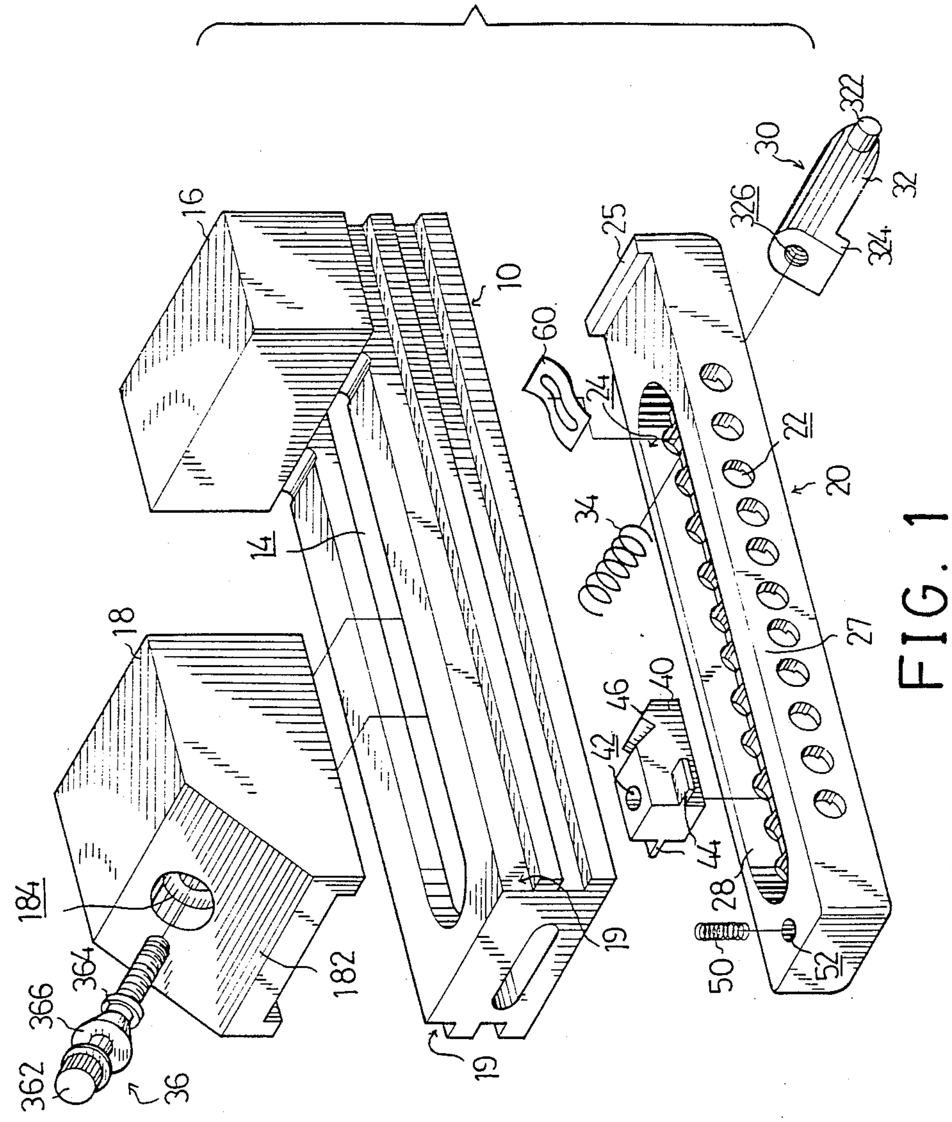
FIG. 1 is an exploded perspective view of a vice in accordance with the present invention.
Figure 2:
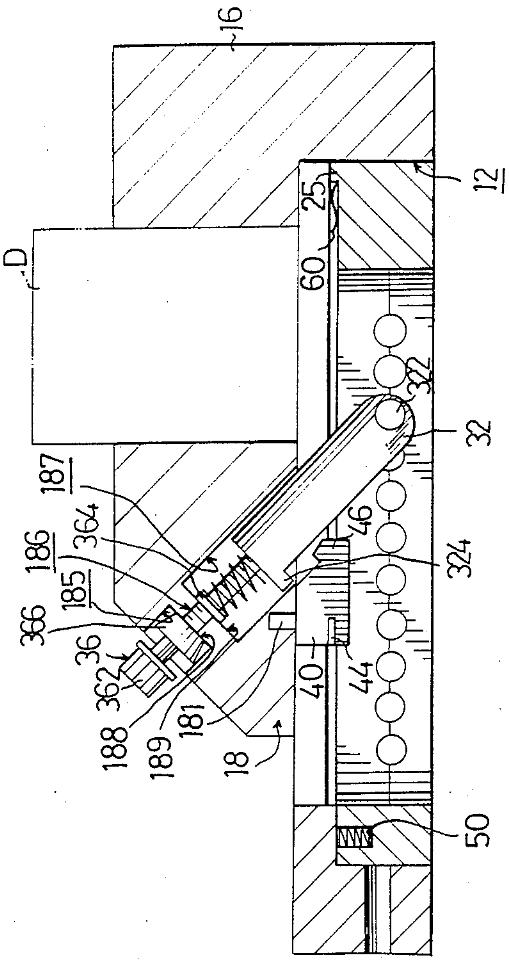
FIG. 2 is a cross-sectional view of an assembled vice in accordance with the present invention.

Referring to FIGS. 1 and 2, the vice according to the present invention comprises a base 10, a rigid rectangular positioning body 20 and a fastening means 30. The base 10 has a central slot 14 extending along a length of the base 10. On an underside of the base 10 there is a rectangular recess 12 extending along a length of the slot for receiving the rectangular positioning body 20. A fixed jaw 16 is provided on one end of the base 10 while a movable jaw 18 is provided on the other end of the base 10 and is movable along a track 19 on the base 10.

Figure 3:
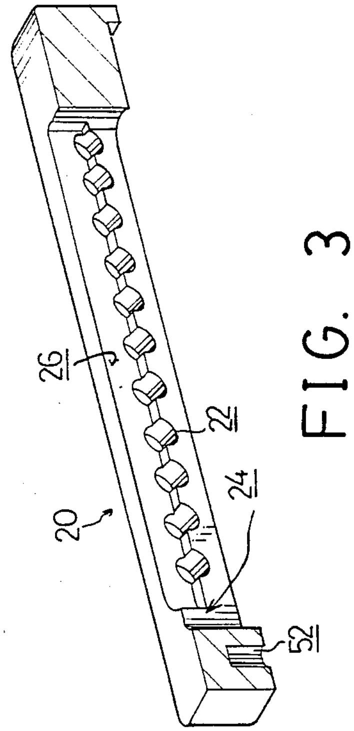
FIG. 3 is a cut-away perspective view of a rectangular positioning body of the vice according to the present invention showing the exploded holes provided on the rectangular body.

The rectangular positioning body 20 also has a central slot 24 extending longitudinally and defining two longitudinal side walls 27 and 28. On each longitudinal side wall 27, 28 of the positioning body 20 there is provided a plurality of holes 22. As shown in FIG. 3, a recess 26 is formed on the underside of the positioning body 20 and extends longitudinally along a length of the slot 24 and extends transversely a distance half the width of the longitudinal side walls such that the holes are notched. On the top surface of the body 20 there is provided a strip-like projection 25 protruding from an end thereof and is located below the fixed jaw 16 when the positioning body 20 is received in the recess 12 of the base 10.

The movable jaw 18 has an inclined surface 182 which faces the second end of the base 10. The inclined surface 182 has a through hole 184 formed therein which penetrates to the underside of the movable jaw 10 in a direction substantially perpendicular to a plane on which the inclined surface 182 locates. The through hole 184 communicates with the slot 14 of the base 10. As shown in FIG. 2, the through hole 184 comprises a first recess 185, a neck 186 and a second recess 187 with a first shoulder 188 formed between the first recess 185 and the neck portion 186 as well as a second shoulder 189 formed between the neck portion 186 and the second recess 187. A dowel 181 protrudes from the underside of the movable jaw 18 for engaging with a recess 42 of a block 40 which will be discussed later in detail.

The fastening means 30 comprises a substantially cylindrical screw receiver 32, a spring 34 and a fastening screw 36. A rectangular protrusion 324 is formed at an upper portion of the screw receiver 32 and a central threaded hole 326 is formed in the screw receiver 32 for engaging with the fastening screw 36. The screw receiver 32 has two lugs 322 formed on a lower portion thereof. Alternatively, the lugs 322 can be constructed by a pin penetrating a pin hole (not shown) formed in the lower portion of the screw receiver 32 with two exposed lugs. On the fastening screw 36, above a threaded portion, there is provided a screw stop 364 to prevent the fastening screw 36 from dislodging from the through hole 184. A washer 366 below the screw head 362 is received in the first recess 185 to retain the screw head 362 above the inclined surface 182 for operation.

The block 40 has a recess 42 formed on a top face thereof to engage with the dowel 181 of the movable jaw 18. Two wings 44 are symmetrically formed on a middle portion of both lateral surfaces of the block 40 and extend transversely, forming an overhang to rest on a top surface of the body 20. The block 40 further comprises a stop 46 opposite the two wings 44 which will be illustrated later in detail. The width of the block 40 is the same as that of the slot 24 of the body 20 such that the block 40 is longitudinally slidable within the slot 24 with the two wings resting the on the top surface of the positioning body 20.

During tightening operation, the movable jaw 18 is fixed to the base 10 by rotating the fastening screw 36 in a first direction which lifts the screw receiver 32 and the fastening lugs 322 engage with the notched upper periphery of the hole 22*s*. On the other hand, during a loosening operation, the movable jaw 18 is slidable along the track 19 of the base 10 by rotating the fastening screw 36 in a second direction which causes the screw receiver 36 to move downwards thereby causing the lugs 322 to fall from the notched upper periphery of the holes 22.

Referring to FIG. 2 in which the vice is in a tightened state, the dowel 181 is firmly engaged into the recess 42 such that the wings 44 rest on the top surface of the positioning body 20. The fastening screw 36 passes the through hole 184 of the movable jaw 18 and is engaged with the threaded hole 326 of the screw receiver 32. In order to fix the processing material D, the fastening screw 36 is loosened sufficiently so that the screw receiver 32 moves downwards until the protrusion 324 of the screw receiver 32 contacts with the stop 46 of the block 40, which causes the lugs 322 to fall from the notched upper periphery of the holes 22 of the positioning body 20. The processing material is placed on the vice against the fixed jaw 16. Then the movable jaw 18 is slided along the track 19 toward the fixed jaw 16 until the movable jaw 18 comes in contact with the processing material D. Then, by tightening the fastening screw 36 into the threaded hole 326, the screw receiver 32 moves upwards such that the lugs 322 engage with the notched upper periphery of one pair of the holes 22 of the positioning body 20. The processing material D is therefore fixed.

Figure 4:
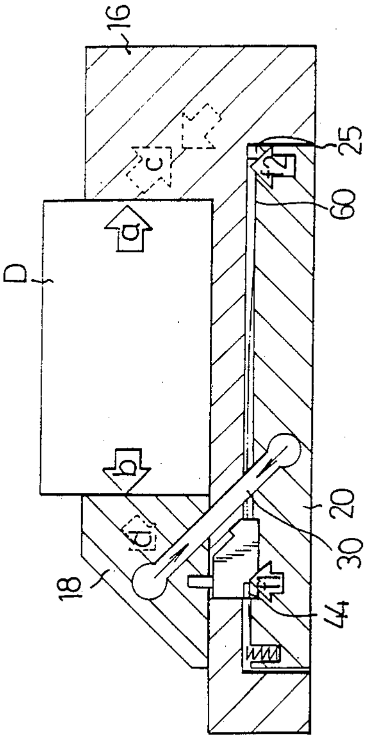
FIG. 4 is a cross-sectional view of the vice according to the present invention showing the balance of stress provided by the present vice.
Figure 5:
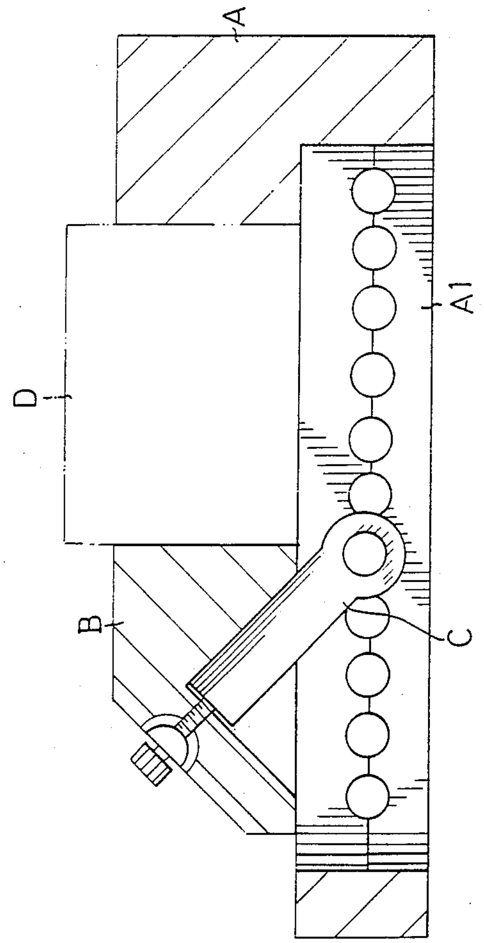
FIG. 5 PRIOR ART
FIG. 5 is a cross-sectional view of a prior vice.
Figure 6:
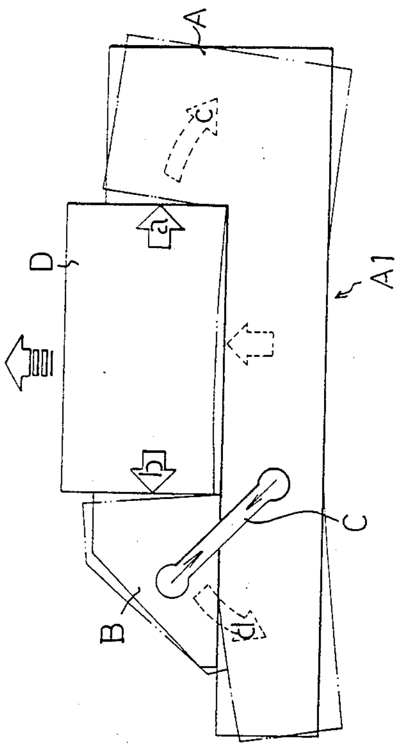
FIG. 6 PRIOR ART
FIG. 6 is a schematic view of the prior vice in FIG. 5 showing the deformation of the vice due to reactive force generated by the processing material.

In a tightened state, as shown in FIG. 4, the processing material D is fixed between the two jaws 16 and 18. As a result, the processing material D generates reactive forces a and b in response to the compression applied by the jaws. Accordingly, the vice generates forces c and d which flex or deform the midsection of the vice. Consequently, the processing material D deforms and moves slightly upwards. Nevertheless, due to the provision of the projection 25 on the positioning body 20 and the wings 44 on the block 40, there are two upward forces f1 and f2 exerted. Accordingly, the reactive forces a and b of the processing material D caused by the jaws 16 and 18 are largely reduced and the deformation of the vice is eliminated. Furthermore, the distance between the wings and the positioning pin (i.e., the lugs 322) is 0.5 to 2 times the distance between the positioning pin and the projection 25 which achieves the best stress balance according to the present invention.

The present invention further comprises a spring 50 installed in a cavity 52 and an elastic plate 60 provided on the top surface of the positioning body 20 adjacent the projection 25 to assist in the removal of the positioning body 20 when disassembly of the vice is desired.

While the present invention has been explained in relation to its preferred embodiment, it is to be understood that various modification thereof will be apparent to those skilled in the art upon reading this specification. Therefore, it is to be understood that the invention disclosed herein is intended to cover all such modifications as fall within the scope of the appended claims.

I claim:

1. A vice comprising a base with a track, a rectangular positioning body, a block and a fastening means, said base having a fixed jaw formed at a first end thereof and a movable jaw being movably provided on said track adjacent to a second end of said base for holding a processing material in cooperation with said fixed jaw, said base having a central first slot extending along a length thereof, a first rectangular recess being formed on an underside of said base and extending along a length of said first slot for receiving said rectangular positioning body;

said movable jaw having an inclined surface which faces said second end of said base, said inclined surface having a through hole formed therein which penetrates to said underside of said movable jaw in a direction substantially perpendicular to a plane on which said inclined surface is located, said through hole communicating with said slot of said base, a dowel protruding from said underside of said movable jaw for engaging with a recess of said block;

said rectangular positioning body having a second central slot extending longitudinally and defining two longitudinal side walls, a plurality of holes being formed on each longitudinal side wall of said positioning body, a second recess being provided on said underside of said positioning body and extending longitudinally along a length of said second slot and extending transversely a distance half a width of said longitudinal side walls such that said holes are notched, a projection protruding from an end of said top surface of said positioning body and being located below said fixed jaw when said positioning body is received in said first recess of said base;

said fastening means comprising a substantially cylindrical screw receiver, a spring and a fastening screw, a rectangular protrusion being formed on an upper portion of said screw receiver and a central threaded hole being formed in said screw receiver for receiving and engaging with said fastening screw, said screw receiver having a pin penetrating a pin hole on a lower portion of said screw receiver with two exposed lugs, a screw stop being provided on the fastening screw above a threaded portion of said fastening screw for preventing said fastening screw from dislodging from said through hole;

said block having a recess formed on a top face thereof for engaging with said dowel of said movable jaw, two wings being symmetrically provided on a middle portion of both lateral surfaces of said block and extending transversely, forming an overhang for resting on a top surface of said positioning body, a stop being formed on said block opposite to said two wings, said block having a width the same as said second slot of said positioning body such that said block is longitudinally slidable within said second slot with said two wings resting on said top surface of said positioning body;

in a tightened state, said movable jaw is fixed on said base in which said lugs engage with an upper periphery of one pair of said notched holes; and in a released state, said movable jaw is slidable along said track of said base while said lugs disengage with said upper periphery of said notched holes and said protrusion of said screw receiver contacts with said stop of said block.

2. A vice as claimed in claim 1 wherein the distance between said wings and said positioning pin is 0.5 to 2 times the distance between said positioning pin and said projection.

3. A vice as claimed in claim 1 further comprising a spring provided in a cavity formed on said top surface on said positioning body and an elastic plate provided on said top surface of said positioning body adjacent to said projection to assist in the removal of said positioning body when disassembling said vice.

* * * * *